(12) United States Patent
Milley et al.

(10) Patent No.: US 11,611,467 B2
(45) Date of Patent: Mar. 21, 2023

(54) ENHANCED MANAGEMENT OF NETWORK OUTAGES

(71) Applicant: Cox Communications, Inc., Atlanta, GA (US)

(72) Inventors: Drew Milley, Atlanta, GA (US); Tuba Aktaran-Kalayci, Atlanta, GA (US); Brad Pfaff, Atlanta, GA (US); Brian Stublen, Atlanta, GA (US); Shane Yates, Atlanta, GA (US); Will Gao, Atlanta, GA (US); Christian Welin, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/817,695

(22) Filed: Aug. 5, 2022

(65) Prior Publication Data
US 2022/0376969 A1    Nov. 24, 2022

Related U.S. Application Data

(63) Continuation of application No. 17/241,998, filed on Apr. 27, 2021, now Pat. No. 11,438,213.

(51) Int. Cl.
*H04L 41/0631* (2022.01)
*H04L 41/069* (2022.01)
*H04L 41/0604* (2022.01)

(52) U.S. Cl.
CPC .......... *H04L 41/064* (2013.01); *H04L 41/069* (2013.01); *H04L 41/0622* (2013.01); *H04L 41/0627* (2013.01)

(58) Field of Classification Search
CPC ............... H04L 41/064; H04L 41/0622; H04L 41/0627; H04L 41/069
USPC ........................................................ 370/242
See application file for complete search history.

(56) References Cited

U.S. PATENT DOCUMENTS

| | | | |
|---|---|---|---|
| 7,975,187 B2 * | 7/2011 | Kogan | H04L 41/0631 714/48 |
| 10,742,649 B1 * | 8/2020 | Hook, Jr | H04L 63/0272 |
| 10,776,723 B1 * | 9/2020 | Hopkins | G06Q 30/0255 |
| 11,107,045 B2 * | 8/2021 | Meranda | G06Q 10/20 |
| 11,252,052 B1 * | 2/2022 | Babu Balasubramani | H04L 41/0654 |
| 11,386,153 B1 * | 7/2022 | Greene | G06F 16/81 |

(Continued)

*Primary Examiner* — Melvin H Pollack
(74) *Attorney, Agent, or Firm* — Eversheds Sutherland (US) LLP

(57) ABSTRACT

This disclosure describes systems, methods, and devices related to network outage management. A method may include receiving a first indication of a first cable system outage. The method may include identifying a start time associated with the first cable system outage, and determining, based on the start time, a time period during which to refrain from generating a service ticket indicative of the first cable system outage. The method may include determining that the first cable system outage has not ended at an end time of the time period, and receiving a second indication of a second cable system outage. The method may include determining that the second cable system outage begins during the time period and has not ended at the end time. The method may include generating and sending a service ticket indicative of the first cable system outage and the second cable system outage.

20 Claims, 6 Drawing Sheets

(56) References Cited

U.S. PATENT DOCUMENTS

| | | | |
|---|---|---|---|
| 2010/0014431 A1* | 1/2010 | Bajpay | H04L 41/06 370/242 |
| 2015/0381405 A1* | 12/2015 | Male | H04L 41/0631 709/223 |
| 2018/0308031 A1* | 10/2018 | Yan | G06Q 10/06 |
| 2020/0295984 A1* | 9/2020 | Qian | H04L 41/0853 |
| 2021/0303793 A1* | 9/2021 | Wang | G06F 40/232 |
| 2021/0392093 A1* | 12/2021 | Mia | H04L 51/18 |
| 2022/0150132 A1* | 5/2022 | Mara | G06N 20/00 |

* cited by examiner

ENHANCED MANAGEMENT OF NETWORK OUTAGES

CROSS-REFERENCE TO RELATED PATENT APPLICATION

This application is a continuation of and claims priority from U.S. Non-Provisional application Ser. No. 17/241,998, filed Apr. 27, 2021, the disclosure of which is incorporated herein by reference as if set forth in full.

TECHNICAL FIELD

This disclosure generally relates to devices, systems, and methods for network outage management.

BACKGROUND

Service providers, such as multiple-system operators, may monitor service performance to identify performance issues. For example, poor service performance may indicate a service outage that may undermine customer's experience and the operation of devices. Identifying and responding to service performance issues may be inefficient for some systems.

Figure 1:
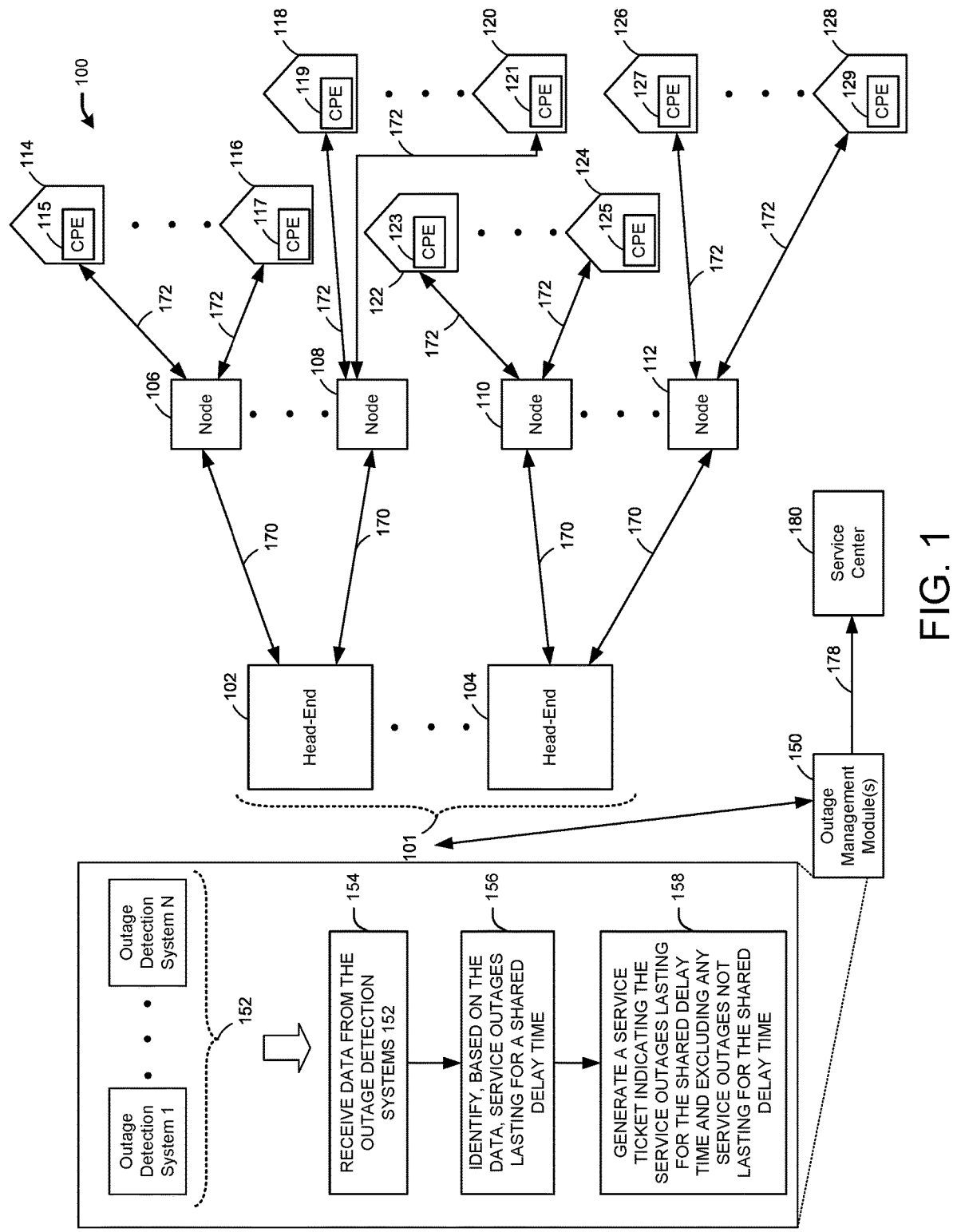
FIG. 1 illustrates an example system for network outage management, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for network outage management. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Multiple-system operators (MSOs) operate multiple customer services, such as broadband and television. Some MSOs may use a variety of systems to deliver services, such as optical networks, networks using the Data Over Cable Service Interface Specification (DOCSIS), and the like.

Monitoring different types of data for different services may be inefficient. For example, MSOs and other service providers may rely on different service outage detection models that identify performance data anomalies (e.g., indicative of service outages), such as a call-based detection model to detect when a call volume significantly deviates from an expected call volume at a particular time, a customer service call model to detect when a significant number of customers within a geographic area make customer service calls at a particular time, a modem-based detection model to detect when a percentage of modems lose a connection, and the like.

System outages may occur at many locations. For example, an outage may be system-wide, market-wide, or at the node level. In particular, MSOs and other service providers may provide service to a variety of customer premises equipment (CPE), where many CPE (e.g., the one or more CPE of 500 customers) may be in communication with a respective node, and a system may include many nodes. For example, a node may provide service to all the CPE of a neighborhood. Fiber optics and other connections may deliver data to a node, and coaxial cable or other connections may deliver the data the "last mile" from the node to the CPE. Most system outages may occur at the node level.

Because the different outage detection models may detect varying data anomalies at different nodes, sometimes service outages affecting different CPE serviced by one node or across multiple nodes may be related. For example, a service outage that affects CPE serviced by multiple nodes may result in the detection of related outages for the multiple nodes and CPE, and sometimes a service outage that affects CPE serviced by one node may be unrelated to a service outage that affects CPE serviced by another node.

When an outage is detected by an outage detection model, a system may generate a service ticket to investigate and/or repair the devices experiencing the service outage. In a system with many nodes and CPE, and multiple outage detection models to detect the different types of service outages that may occur, some generated service tickets may indicate outage events that may be related to the same performance problem. As a result, many service tickets may be generated to address the same problem, resulting in an inefficient use of automated and manual resources. In addition, it may be unclear to an automated system and/or human operator, based on the data indicative of service outage, the defined start and end time of an outage event, as the automated system and/or human operator may be limited to performance data signatures indicating the service outage. Some systems may generate a service ticket when an outage is detected, and may generate another service ticket when the outage ends, resulting in multiple service tickets for the same outage.

There is therefore a need for enhanced management of network outages.

In one or more embodiments, a system (e.g., a MSO system that provides different services to multiple customers) may consolidate outage information detected by multiple outage detection models, and may reduce the number of service tickets generated based on the outage information. For example, rather than each outage detection model generating service tickets for every detected outage, the system may wait for a time (e.g., a "soak" or "delay" time) to identify related outage events that have not been resolved during the delay time. Many detected outage events may resolve before the delay time expires. As a result, the system may avoid generating service tickets for such events, and may issue service tickets for events that persist beyond the delay time. This process may be referred to as "soaking." The delay time may have a definitive start time and end time. The start time may represent a time at which a service outage is detected using any of the outage detection models. Once a service outage is detected, the system may set the delay time and determine whether any other outages are detected by any of the outage detection models during the delay time. Any outage detected during the delay time, detected using any outage performance criteria, that persists after expiration of the delay time may result in generation of a service ticket (e.g., indicating the service outage type, location, data used to identify the outage, etc.), and any detected outages resolved before expiration of the delay time may be discarded without generating a corresponding service ticket. In addition, in this manner, the number of service tickets may be reduced, and some service tickets may combine outage data detected using different outage detection models.

Benefits of the enhanced system may include reduced service tickets generated, identification of service outages that may be caused by the same or different events, consolidated information from across multiple nodes using multiple outage detection models to reduce human operator workload, and a defined start and end time of events related to network service outages.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for network outage management, in accordance with one or more example embodiments of the present disclosure.

Referring to FIG. 1, the system 100 may include head-ends (e.g., head-end 102, head-end 104), which may refer to a facility and/or devices for receiving and processing signals, and distributing content (e.g., television content) to nodes (e.g., hybrid fiber-coaxial—HFC—nodes such as node 106, node 108, node 110, node 112), and ultimately to CPE of customer homes (e.g., home 114 with CPE 115 serviced by node 106, home 116 with CPE 117 serviced by node 106, home 118 with CPE 119 serviced by node 108, home 120 with CPE 121 serviced by node 108, home 122 with CPE 123 serviced by node 110, home 124 with CPE 125 serviced by node 110, home 126 with CPE 127 serviced by node 112, home 128 with CPE 129 serviced by node 112). The nodes may include taps, amplifiers, splitters, and the like to receive signals from the head-ends, and to provide content in the form of signals to the CPE of many homes. The nodes may collect metrics for the respectively serviced CPE, and may provide the metrics to the head-ends and/or to one or more outage management modules 150, which may be implemented in a head-end or in a remote device (e.g., a service center, a cloud-based environment, or the like).

Still referring to FIG. 1, the one or more outage management modules 150 may include or have access to outage detection systems 152 (e.g., outage detection system 1—outage detection system N), any of which may detect system outages at the CPE level, node level, head-end level, or the like. For example, the detection systems 152 may implement different models that identify data anomalies (e.g., indicative of service outages), such as a call-based detection model to detect when a call volume significantly deviates from an expected call volume at a particular time, a customer service call model to detect when a significant number of customers within a geographic area make customer service calls at a particular time, a modem-based detection model to detect when a percentage of modems lose a connection, and the like. The detection systems 152 may output respective data indicative of the occurrence of outage events (e.g., because respective cable system outage criteria is or is not satisfied), a time when the outage events occur, and a location of the outage events (e.g., a customer address, a node, a head-end, etc.).

Still referring to FIG. 1, the one or more outage management modules 150 may ingest output (e.g., outage) data from the models used by the detection systems 152, which may include some indicator of the location of detected events, the times when the events started, and the times when the events ended. The one or more outage management modules 150 may generate a master event record (e.g., a service ticket) upon receiving an indication of a first outage event, may aggregate more outage event data (e.g., for a same geographic area as the first outage event), and may update the master event record accordingly. The one or more outage management modules 150 may close out the master event record once any constituent events have been closed. In particular, as shown, at step 154, the one or more outage management modules 150 may receive event data from the outage detection systems. The event data may indicate a service outage, such as a high number of calls, a high number or percentage of modems disconnected (e.g., from a node), or the like. At step 156, the one or more outage management modules 150 may identify, based on the data, a start time for a service outage, and may set an end time after the start time (e.g., two minutes or any other amount of time), with the start time and end time representing a delay or soak time period during which the one or more outage management modules 150 may evaluate any service outage events detected by the detection systems 152 to determine whether the service outage events resolve before expiration of the delay or soak time period. When any events occurring during the delay or soak time period continue beyond the end time of the delay or soak time period, such may indicate that the events are related (e.g., caused by a common event, such as a poor connection, a device failure, a communication medium failure, or the like). At step 158, the one or more outage management modules 150 may generate a service ticket indicating any events that occurred during the delay or soak time period (e.g., beginning within a threshold amount of time before or after the start time and lasting beyond the end time).

In one or more embodiments, system outages may occur at many locations. For example, an outage may be system-wide, market-wide, or at the node level. In particular, MSOs and other service providers may provide service to a variety of CPE, where many CPE may be in communication with a respective node (e.g., the node 106), and the system 100 may include many nodes. For example, a node may provide service to all the CPE of a neighborhood. Fiber optics and other connections (e.g., connections 170) may deliver data to one or more nodes, and coaxial cable or other connections (e.g., connections 172) may deliver the data the "last mile"

from the nodes to the CPE. Most system outages may occur at the node level. The connections 170 may include wired and/or wireless connections according to DOCSIS, optical connections, and the like.

Because the different outage detection systems 152 may detect varying data anomalies at different nodes, sometimes service outages at different CPE at one node or across multiple nodes may be related. For example, a service outage that affects CPE serviced by the node 106 also may affect CPE serviced by the node 108 and/or any other nodes (e.g., the outages at different nodes may be related, such as caused by the connections 170, the headend 102 and/or the headend 104, etc.).

In one or more embodiments, when an outage is detected by the outage detection systems 152, the one or more outage management modules 150 may generate a service ticket 178 to investigate and/or repair the devices experiencing the service outage. The one or more outage management modules 150 may send the service ticket 178 to the service center 180 (e.g., to one or more devices capable of displaying the service ticket 178) or elsewhere for processing. In the system 100 with many nodes and CPE, and multiple outage detection models used by the outage detection systems 152 to detect the different types of service outages that may occur, some service tickets generated may be related to the same performance problem causing the service outages. As a result, many service tickets otherwise may be generated to address the same problem, resulting in an inefficient use of automated and manual resources. In addition, it may be unclear to an automated system and/or human operator, based on the data indicative of service outage, the defined start and end time of an event that may cause a service outage, as the automated system and/or human operator may be limited to the data signatures indicating the service outage. However, because of the enhanced techniques (e.g., steps 152-156) used by the one or more outage management modules 150, the system 100 may result in reduced service tickets generated, identification of service outages that may be caused by the same or different events, consolidated information from across multiple nodes using multiple outage detection models to reduce human operator workload, and a defined start and end time of events related to network service outages.

In one or more embodiments, the outage detection systems 152 may include devices, systems, modules, and the like for analyzing data collected from the CPE, the nodes, and/or the head-ends (e.g., using wired and/or wireless connections). The outage detection systems 152 may determine cable system outage detection criteria. For example, the outage detection systems 152 may use convolutional neural networks or other machine learning trained on some initial training data that may include cable system outage detection criteria. The outage detection systems 152 may adjust the cable system outage detection criteria based on the training data and any machine learning that may identify when performance of the system 100 is indicative of or not indicative of an actual service outage. For example, the outage detection systems 152 may adjust the thresholds shown in FIGS. 2A and 2B using machine learning over time.

Figure 2A:
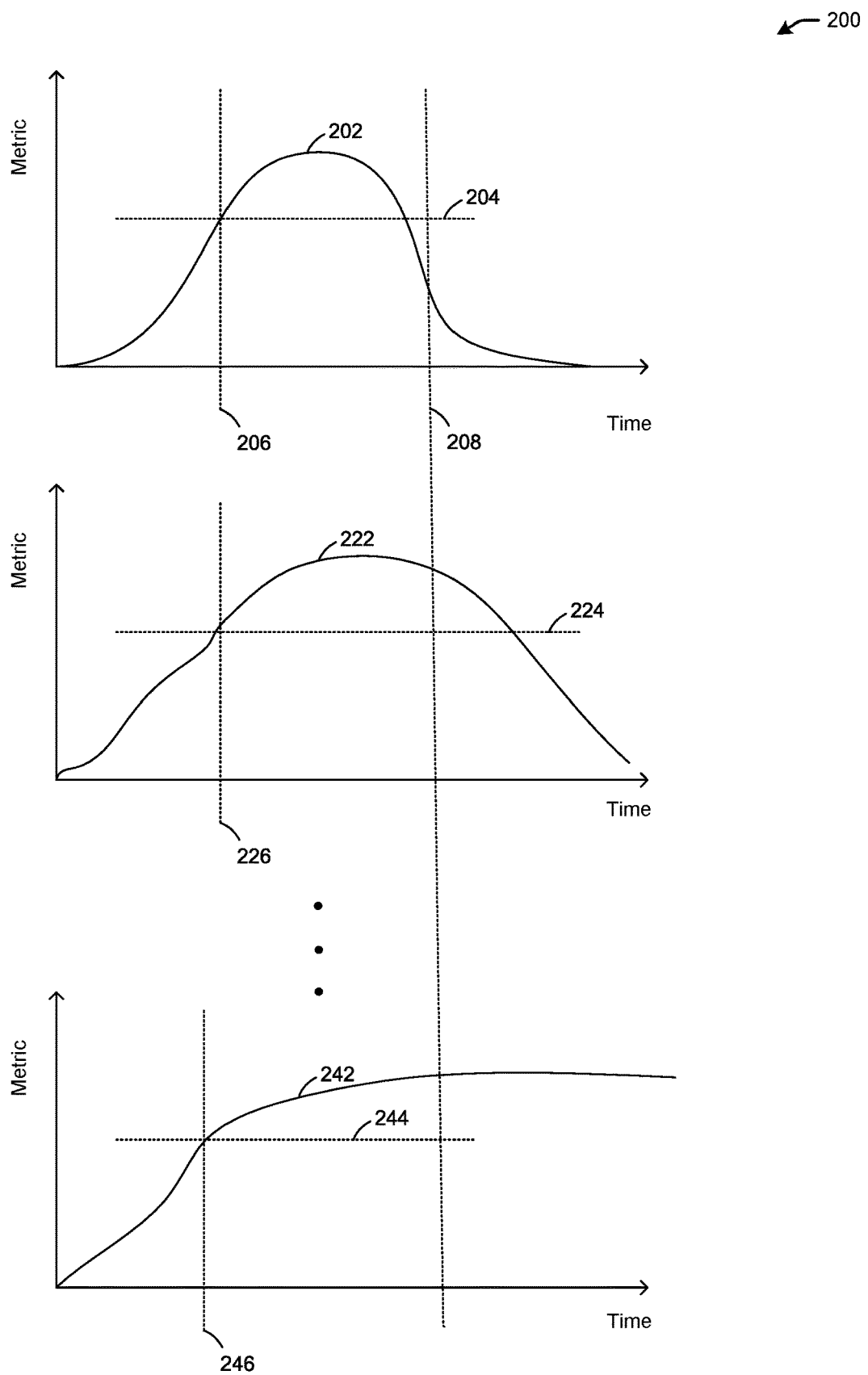
FIG. 2A illustrates example graphs of metrics evaluated by the outage detection systems of FIG. 1, in accordance with one or more embodiments of the present disclosure.

FIG. 2A illustrates example graphs 200 of metrics evaluated by the outage detection systems 152 of FIG. 1, in accordance with one or more embodiments of the present disclosure.

Referring to FIG. 2A, multiple graphs are shown, representing a variety of performance metrics monitored for the system 100 of FIG. 1. For example, the metrics may include call volume, number or percentage of CPE whose connections have been lost during a time period, number or percentage of nodes whose connections have been lost during a time period, or the like. The graphs shown in FIG. 2A represent cable system outages when the metrics are above a threshold value.

As shown, a metric 202 may exceed a threshold value 204 at time 206 and returned below the threshold value 204 by time 208, indicating a service outage began at time 206. Metric 222 may exceed a threshold value 224 at time 226 and did not return below the threshold value 224 by the time 208, indicating a service outage began at time 226 that was not resolved by the time 208. Metric 242 may exceed a threshold value 244 at time 246 and may not return below the threshold value 244 by the time 208. The individual models used by the outage detection systems 152 of FIG. 1 may cause generation of separate service tickets for the three scenarios: One when the metric 202 exceeds the threshold value 204, one when the metric 222 exceeds the threshold value 224, and one when the metric 242 exceeds the threshold value 244. However, the one or more outage management modules 150 of FIG. 1 may set and use a delay time to determine if any of the metrics still exceed their respective threshold values (the same or different values) after the delay time. For example, the one or more outage management modules 150 may determine that the metric 202 exceeds the threshold value 204 at the time 206, and may set the time 208 so that the delay time is the time period between the time 206 and the time 208. The time 208 (e.g., the delay time) may be set intuitively or may be learned (e.g., as explained with respect to FIG. 2C). The one or more outage management modules 150 may determine that the metric 222 exceeds the threshold value 204 at the time 226, and that the metric 242 exceeds the threshold value 244, but that the metric 222 and the metric 242 persist above the threshold value 224 and the threshold value 244, respectively, beyond the time 208 (e.g., the delay time). Because the metric 202 does not persist above the threshold value 224 beyond the delay time (e.g., time 208), the one or more outage management modules 150 may discard the metric 202 and refrain from including the metric 202 in a service ticket for an outage during the delay time. Because the metrics 222 and 242 persist above their respective threshold values beyond the delay time, the one or more outage management modules 150 may generate a single service ticket that indicates metrics 222 and 242 during the delay time.

Figure 2B:
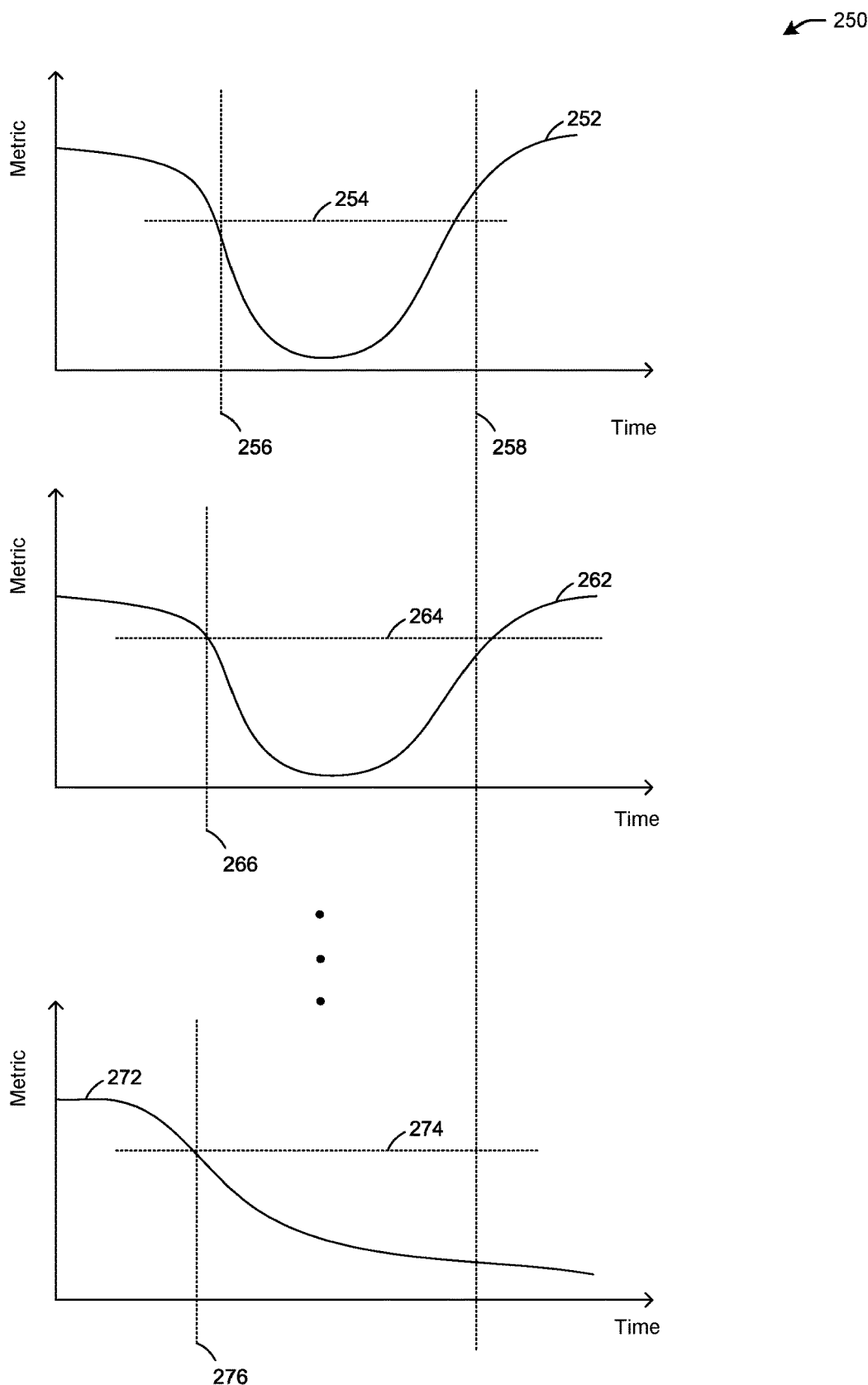
FIG. 2B illustrates example graphs of metrics evaluated by the outage detection systems of FIG. 1, in accordance with one or more embodiments of the present disclosure.

FIG. 2B illustrates example graphs 250 of metrics evaluated by the outage detection systems 152 of FIG. 1, in accordance with one or more embodiments of the present disclosure.

Referring to FIG. 2B, multiple graphs are shown, representing a variety of performance metrics monitored for the system 100 of FIG. 1. For example, the metrics may include call volume, number or percentage of CPE whose connections have been lost during a time period, number or percentage of nodes whose connections have been lost during a time period, or the like. The graphs shown in FIG. 2B represent cable system outages when the metrics are below a threshold value.

As shown, a metric 252 may fall below a threshold value 254 at time 256 and returned above the threshold value 254 by time 258, indicating a service outage began at time 256. Metric 262 may exceed a threshold value 264 at time 266 and did not return above the threshold value 264 by the time 258, indicating a service outage began at time 266 that was not resolved by the time 258. Metric 272 may fall below a threshold value 274 at time 276 and may not return above the threshold value 274 by the time 258. The individual models used by the outage detection systems 152 of FIG. 1 may cause generation of separate service tickets for the three scenarios: One when the metric 252 falls below the threshold value 254, one when the metric 262 exceeds the threshold value 264, and one when the metric 272 exceeds the threshold value 274. However, the one or more outage management modules 150 of FIG. 1 may set and use a delay time to determine if any of the metrics still exceed their respective threshold values (the same or different values) after the delay time. For example, the one or more outage management modules 150 may determine that the metric 252 exceeds the threshold value 254 at the time 256, and may set the time 258 so that the delay time is the time period between the time 256 and the time 258. The time 258 (e.g., the delay time) may be set intuitively or may be learned (e.g., as explained with respect to FIG. 2C). The one or more outage management modules 150 may determine that the metric 262 is below the threshold value 264 at the time 266, and that the metric 272 is below the threshold value 274, but that the metric 262 and the metric 272 persist below the threshold value 264 and the threshold value 274, respectively, beyond the time 258 (e.g., the delay time). Because the metric 252 does not persist below the threshold value 254 beyond the delay time (e.g., time 258), the one or more outage management modules 150 may discard the metric 252 and refrain from including the metric 252 in a service ticket for an outage during the delay time. Because the metrics 262 and 272 persist below their respective threshold values beyond the delay time, the one or more outage management modules 150 may generate a single service ticket that indicates metrics 262 and 272 during the delay time.

Referring to FIGS. 2A and 2B, the start times (e.g., time 206, time 226, and 246 in FIG. 2A, and time 256, time 266, and time 276 in FIG. 2B) may be the same or within a threshold amount of time from one another. In this manner, when the one or more outage management modules 150 identifies a metric that is above or below a threshold value (e.g., based on analysis from the outage detection systems 152), the one or more outage management modules 150 may evaluate other metrics to determine when any of the metrics indicate an outage during the delay time. The one or more outage management modules 150 may use machine learning (e.g., convolutional neural networks, etc.) to determine the delay time based on initial training data that sets a delay time, and may adjust the delay times (e.g., based on a learned time period after which a threshold percentage of detected outage events based on the threshold values resolve, as described further with respect to FIG. 2C).

In one or more embodiments, the metrics shown in FIGS. 2A and 2B may be for a single node or across multiple nodes. In this manner, when the one or more outage management modules 150 detects a metric above or below a threshold value (e.g., as indicated by the outage systems 152), the one or more outage management modules 150 may determine if any other metrics at a same or different node indicate an outage, and whether any outage lasts beyond the delay time. When outages indicated by the different metrics occur during and persist longer than the delay time, such may indicate that the outages, whether at a same node or across different nodes, are related.

Figure 2C:
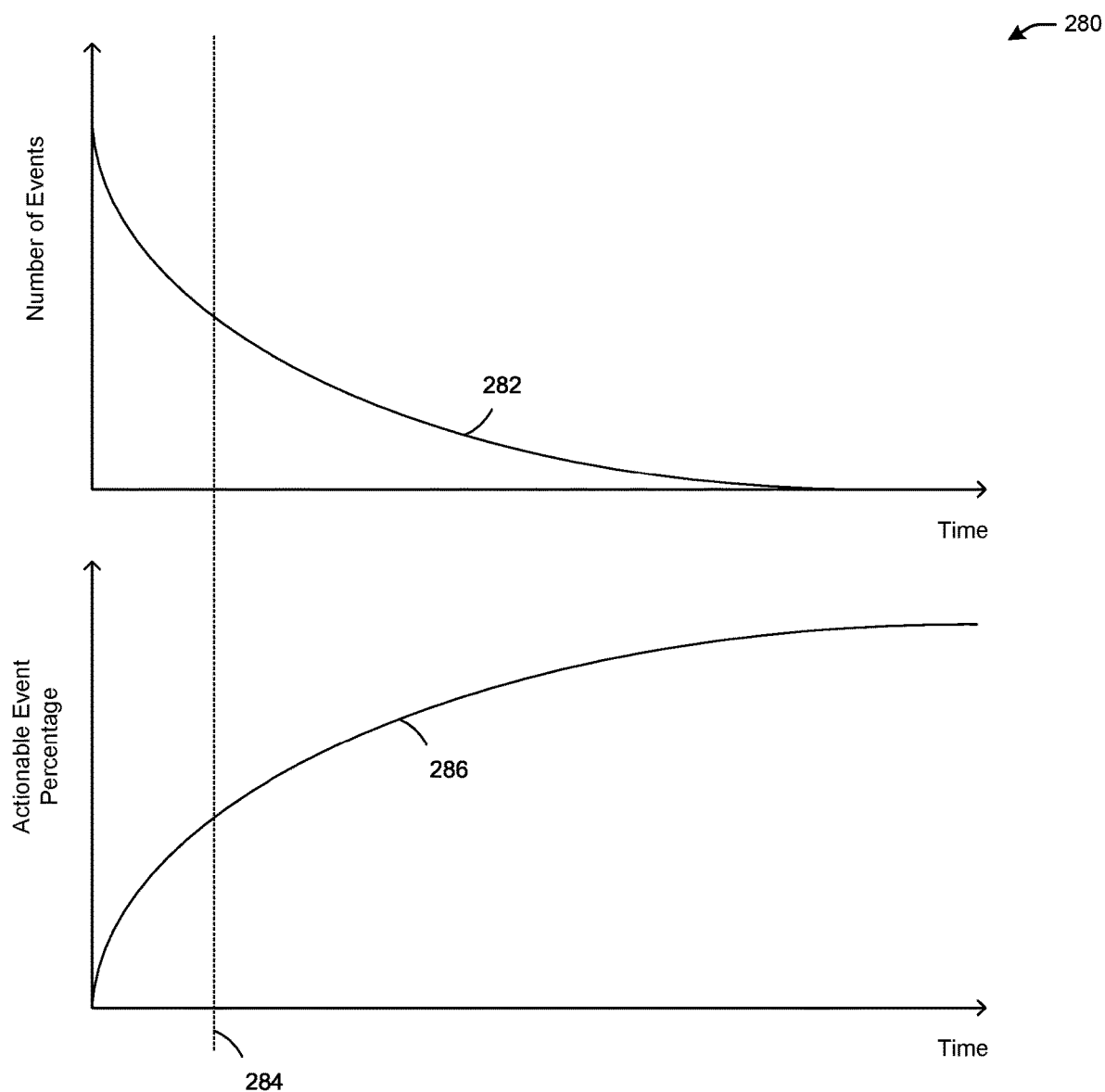
FIG. 2C illustrates example graphs of actionable system outage events over time, in accordance with one or more example embodiments of the present disclosure.

FIG. 2C illustrates example graphs 280 of actionable system outage events over time, in accordance with one or more example embodiments of the present disclosure.

Referring to FIG. 2C, the graphs 280 show that a number of events 282 at a given time (e.g., time zero) decreases as the events 282 are resolved. For example, a number of disconnected devices may be higher at time zero than at time 284 because some of the disconnected devices may reconnect (e.g., CPE to a node, nodes to a headend, etc.) between time zero and the time 284. Prior to the time 284, an actionable event percentage 286 may be low even when the number of events 282 is high. Therefore, suppressing events lasting shorter than the time 284 may result in filtering out of transient events that may not be addressable by a service center, for example. The one or more outage management modules 150 of FIG. 1 may determine the time 284 when the number of events 282 (e.g., actionable events detected using any of the models of the outage detection systems 152 of FIG. 1) may drop below a threshold percentage. In this manner, as the number of events 282 changes over time, so too may the time 284. The time 284 may represent the delay time for FIGS. 2A and 2B (e.g., the time 208 of FIG. 2A may be the time 206 plus the time 284, and the time 258 of FIG. 2B may be the time 256 plus the time 284). The time 284 may be used as a delay time to allow the percentage of the actionable events 286 to resolve (e.g., no longer be actionable because their metrics of FIGS. 2A and 2B have returned below or above threshold values) by the expiration of the time 284 from the start time when the events became actionable (e.g., the time 206 of FIG. 2A, the time 256 of FIG. 2B).

In one or more embodiments, the time 284 may be set and/or adjusted over time. The adjustment may be manual, automatic, or learned (e.g., using machine learning). For example, the one or more outage management modules 150 may learn when the number of events 282 over time drop below a threshold percentage, and may adjust the delay time accordingly for determining which service outages are to be included in service tickets or discarded (e.g., for resolving before expiration of the delay time).

In one or more embodiments, the graphs 280 may represent the number of events 282 and the percentage of actionable events 286 at a given node or across multiple nodes.

Figure 3:
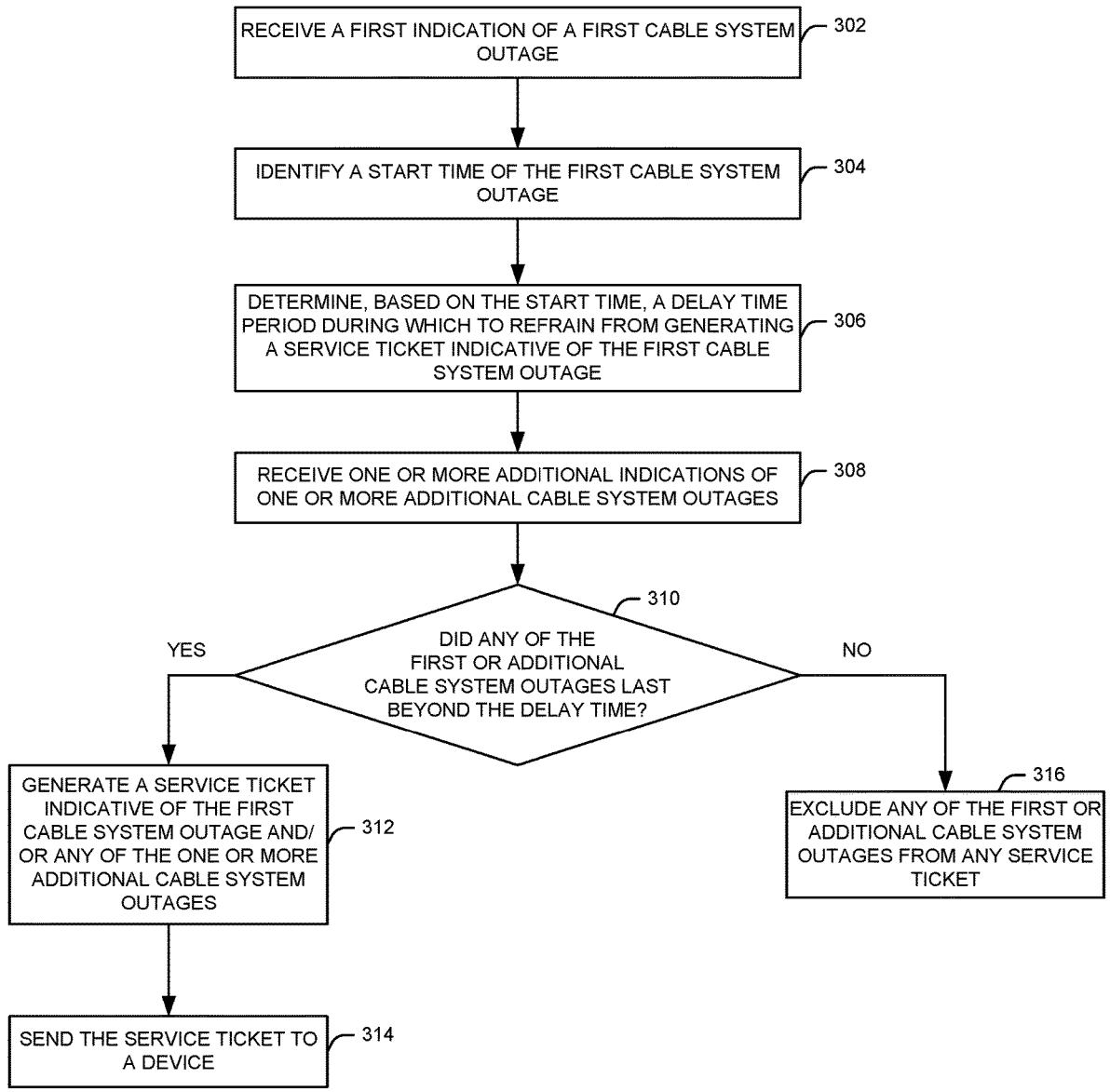
FIG. 3 illustrates a flow diagram of an illustrative process for network outage management, in accordance with one or more example embodiments of the present disclosure.

FIG. 3 illustrates a flow diagram of an illustrative process 300 for network outage management, in accordance with one or more embodiments of the present disclosure.

At block 302, a system (or device, e.g., the one or more outage management modules 150 of FIG. 1) may receive (e.g., from the outage detection systems 152 of FIG. 1) a first indication of a first cable system outage. The first indication of the first cable system outage may be based on a model that evaluates performance criteria (e.g., cable system outage detection criteria) of a system (e.g., a MSO cable system such as the system 100 of FIG. 1). The performance criteria may be represented by any of the metrics shown in FIGS. 2A and 2B, and may represent a number or percentage of disconnected devices (e.g., CPE, nodes, etc.), a number of service calls made (e.g., customer calls indicative of a service outage), or the like. The metrics may indicate that system performance exceeds or is below a threshold value that indicates a likely service outage.

At block 304, the system may identify a start time of the first cable system outage, which may be a time when a metric indicative of system performance goes above or below a respective threshold value (e.g., as shown in FIGS. 2A and 2B). The start time may be determined based on when a number of disconnected devices exceeds a threshold value, when a number of service calls within a time period exceeds a threshold value, or the like.

At block 306, the system may determine a delay time based on the start time. The delay time may represent a time during which the system is to refrain from generating a service ticket indicating the first cable system outage. The system may wait and evaluate after expiration of the delay time whether the first system outage persists beyond the expiration of the delay time (e.g., whether a metric has been above or below a respective threshold value for the period of time represented by the delay time or has returned below or above the respective threshold value by the time the delay time expires, indicating that the service outage has resolved). The delay time may be set and adjusted, for example, based on the number or percentage of outages that persist beyond a time period (e.g., as shown in FIG. 2C). For example, the system may determine the delay time by identifying how long after the start time a percentage of outages below a threshold value persists (e.g., the time at which twenty percent or less of system outages occurring at or near the start time have resolved).

At block 308, the system may receive one or more additional indications of one or more additional cable system outages. Once the system identifies criteria indicating a cable system outage and determines the start time (e.g., block 304), the system may determine whether any other performance criteria (e.g., FIGS. 2A and 2B) indicate other outages at a same or different node, for example. Whether another system outage occurs during the delay time may depend on whether a respective metric exceeds or falls below a threshold value at or near (e.g., within a threshold time) of the start time. In this manner, before generating a service ticket indicating the first cable system outage, the system may evaluate other cable system outages to determine whether they are related and should be combined in a service ticket with the first cable system outage.

At block 310, the system may determine whether the first cable system outage and/or any other cable system outage detected at or near the start time lasted beyond expiration of the delay time (e.g., metrics remained above or below a respective threshold value during the delay time). For example, as shown in FIG. 2A, the metric 202 does not remain above the threshold value 204 beyond the delay time 208, but the metric 222 and the metric 242 remain above the threshold value 224 and the threshold value 244, respectively, beyond the delay time 208. In FIG. 2B, the metric 252 does not remain below the threshold value 254 beyond the delay time 258, but the metric 262 and the metric 272 remain below the threshold value 264 and the threshold value 274, respectively, beyond the delay time 258. When one or more cable system outages indicated by the metrics last beyond the delay time (e.g., have not resolved by the delay time), the process 300 may continue at block 312.

At block 312, the system may generate a service ticket indicative of any of the first cable system outage and/or any other cable system outages that persisted beyond the delay time. In this manner, multiple cable system outages may be aggregated and included in a single service ticket instead of separate service tickets being generated for each outage. At block 314, the system may send the service ticket to another device (e.g., the service center 180 of FIG. 1).

When one or more cable system outages indicated by the metrics do not last beyond the delay time (e.g., have not resolved by the delay time), the process 300 may continue at block 316, where the system may exclude from any service ticket any cable system outages that resolve before expiration of the delay time. In this manner, service tickets may indicate only cable service outages that persist for the delay time so that generation of a service ticket indicating an already resolved outage may be avoided.

It is understood that the above descriptions are for purposes of illustration and are not meant to be limiting.

Figure 4:
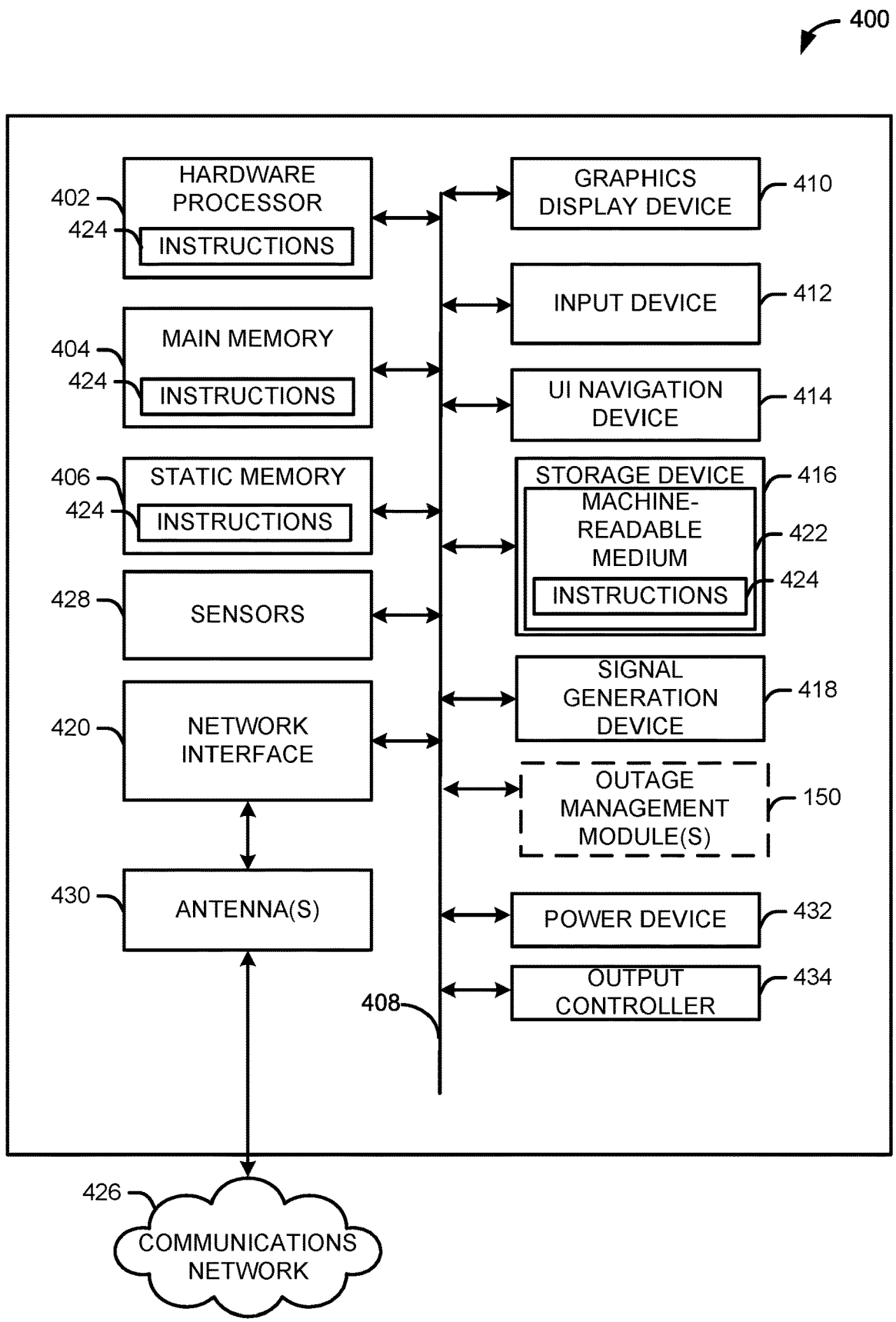
FIG. 4 illustrates a block diagram of an example machine upon which any of one or more techniques (e.g., methods) may be performed, in accordance with one or more example embodiments of the present disclosure.

FIG. 4 illustrates a block diagram of an example of a machine 400 (e.g., the one or more outage management modules 150 of FIG. 1, the outage detection systems of FIG. 1) or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. The machine 400 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include any combination of the illustrated components. For example, the machine 400 may include a hardware processor 402 (e.g., a central processing unit (CPU), a graphics processing unit (GPU), a tensor processing unit (TPU) including an artificial intelligence application-specific integrated circuit (ASIC), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a data signal), the one or more outage management modules 150 of FIG. 1, a network interface device/transceiver 420 coupled to antenna(s) 430, and one or more sensors 428, such as a sound detecting sensor (e.g., a microphone), accelerometers, magnetometers, location sensors, and the like. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for managing network outages, the method comprising:
   receiving, by at least one processor of a first device, a first indication of a first cable system outage;
   identifying, by the at least one processor, a start time associated with the first cable system outage;
   determining, by the at least one processor, based on the start time, a time period during which to refrain from generating a service ticket indicative of the first cable system outage, the time period beginning at the start time and expiring at an end time;
   determining, by the at least one processor, that the first cable system outage has not ended at the end time;
   receiving, by the at least one processor, a second indication of a second cable system outage;
   determining, by the at least one processor, that the second cable system outage begins during the time period and has not ended at the end time;
   generating, by the at least one processor, a service ticket indicative of the first cable system outage and the second cable system outage; and
   sending, by the at least one processor, the service ticket to a second device.

2. The method of claim 1, further comprising:
   receiving a third indication of a third cable system outage;
   determining that the third cable system outage begins and ends during the time period; and
   discarding the third indication without generating a service ticket indicative of the third cable system outage.

3. The method of claim 1, further comprising:
   determining that the first cable system outage and the second cable system outage are associated with a same event,
   wherein generating the service ticket is based on the determination that the first cable system outage and the second cable system outage are associated with the same event.

4. The method of claim 1, wherein the first cable system outage and the second cable system outage are associated with a same node, wherein the same node is in communication with a plurality of customer premises equipment using coaxial cable.

5. The method of claim 1, wherein the first cable system outage is associated with a first node in communication with a first plurality of customer premises equipment using first coaxial cable, and wherein the second cable system outage is associated with a second node in communication with a second plurality of customer premises equipment using second coaxial cable.

6. The method of claim 1, wherein the first indication is based on a number of calls made to a node in communication with a plurality of customer premises equipment using coaxial cable.

7. The method of claim 1, wherein the first indication is based on a percentage of modems disconnected from a node communication with a plurality of customer premises equipment, the plurality of customer premises equipment comprising the modems.

8. The method of claim 1, further comprising:
   receiving a third indication of a third cable system outage; and
   determining that the third cable system outage begins during the time period and has not ended at the end time,
   wherein the service ticket is further indicative of the third cable system outage.

9. A device comprising memory coupled to at least one processor, the at least one processor configured to:
   receive a first indication of a first cable system outage;
   identify a start time associated with the first cable system outage;
   determine, based on the start time, a time period during which to refrain from generating a service ticket indicative of the first cable system outage, the time period beginning at the start time and expiring at an end time;
   determine that the first cable system outage has not ended at the end time;
   receive a second indication of a second cable system outage;
   determine that the second cable system outage begins during the time period and has not ended at the end time;
   generate a service ticket indicative of the first cable system outage and the second cable system outage; and
   send the service ticket to a second device.

10. The device of claim 9, wherein the at least one processor is further configured to:
    receive a third indication of a third cable system outage;
    determine that the third cable system outage begins and ends during the time period; and
    discard the third indication without generating a service ticket indicative of the third cable system outage.

11. The device of claim 9, wherein the at least one processor is further configured to:
    determine that the first cable system outage and the second cable system outage are associated with a same event,
    wherein to generate the service ticket is based on the determination that the first cable system outage and the second cable system outage are associated with the same event.

12. The device of claim 9, wherein the first cable system outage and the second cable system outage are associated with a same node, wherein the same node is in communication with a plurality of customer premises equipment using coaxial cable.

13. The device of claim 9, wherein the first cable system outage is associated with a first node in communication with a first plurality of customer premises equipment using first coaxial cable, and wherein the second cable system outage is associated with a second node in communication with a second plurality of customer premises equipment using second coaxial cable.

14. The device of claim 9, wherein the first indication is based on a number of calls made to a node in communication with a plurality of customer premises equipment using coaxial cable.

15. The device of claim 9, wherein the first indication is based on a percentage of modems disconnected from a node communication with a plurality of customer premises equipment, the plurality of customer premises equipment comprising the modems.

16. The device of claim 9, wherein the at least one processor is further configured to:
 receive a third indication of a third cable system outage; and
 determine that the third cable system outage begins during the time period and has not ended at the end time,
 wherein the service ticket is further indicative of the third cable system outage.

17. A system, comprising:
 a first cable system outage detection system configured to detect cable system outages;
 a second cable system outage detection system configured to detect cable system outages; and
 memory coupled to at least one processor, the at least one processor configured to:
 receive a first indication of a first cable system outage;
 identify a start time associated with the first cable system outage;
 determine, based on the start time, a time period during which to refrain from generating a service ticket indicative of the first cable system outage, the time period beginning at the start time and expiring at an end time;
 determine that the first cable system outage has not ended at the end time;
 receive a second indication of a second cable system outage;
 determine that the second cable system outage begins during the time period and has not ended at the end time;
 generate a service ticket indicative of the first cable system outage and the second cable system outage; and
 send the service ticket to a device.

18. The system of claim 17, wherein the first indication is based on a number of calls made to a node in communication with a plurality of customer premises equipment using coaxial cable, and wherein the first cable system outage detection system is configured to detect the first cable system outage based on the number of calls made to the node.

19. The system of claim 17, wherein the first indication is based on a percentage of modems disconnected from a node in communication with a plurality of customer premises equipment using coaxial cable, and wherein the first cable system outage detection system is configured to detect the first cable system outage based on the percentage of modems disconnected from the node.

20. The system of claim 17, further comprising a third cable system outage detection system configured to detect cable system outages, wherein the at least one processor is further configured to:
 receive a third indication of a third cable system outage;
 determine that the third cable system outage begins and ends during the time period; and
 discard the third indication without generating a service ticket indicative of the third cable system outage.

* * * * *